Figure 1:
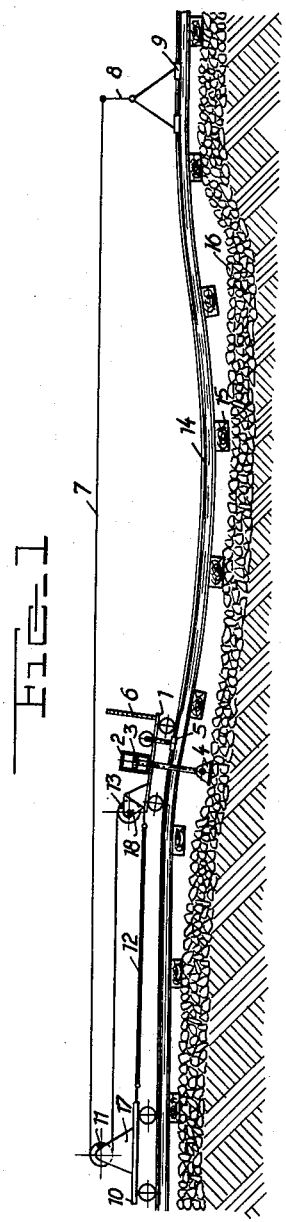

Oct. 20, 1964  F. PLASSER ETAL  3,153,389
APPARATUS FOR CORRECTING THE POSITION OF A TRACK
Filed May 9, 1960

INVENTOR.
FRANZ PLASSER
BY JOSEF THEURER
AGENT

United States Patent Office 3,153,389
Patented Oct. 20, 1964

3,153,389
APPARATUS FOR CORRECTING THE POSITION OF A TRACK
Franz Plasser and Josef Theurer, both of Johannesgasse 3, Vienna I, Austria
Filed May 9, 1960, Ser. No. 27,578
Claims priority, application Austria May 13, 1959
1 Claim. (Cl. 104—7)

The present invention relates to apparatus for correcting the position of a railroad track and is useful in track grading operations as well as in the lateral realignment of a track section.

It has been proposed to use an elongated, flexible member, for instance a wire, extending along the track section to be corrected in systems of this type. None of these systems has survived in modern, automated track maintenance work, either because of intolerable inaccuracies or because too many workmen were required for the complex and time-consuming operation.

We have now found that the disadvantages of conventional track position correction systems may be eliminated and a highly efficient and accurate apparatus of this type may be obtained if the elongated, flexible tension member extends or stretches from a fixed point located in front of a mobile track correction vehicle running on the track section to be corrected, for instance a track lifting car, to a movable point located behind the vehicle, both in the direction of travel of the vehicle.

In one embodiment of the present invention, the movable point is movable in unison with the track correction vehicle.

Throughout the specification and claim, the term "track grade correction vehicle" is used to designate a car adapted to travel on a track and carrying track gripping means as well as means for moving the track vertically in relation to the track axis and a measuring device by which the position of the track is determined.

The advantage of an arrangement according to the invention is twofold:

(1) The fixed point ahead of the mobile track grade correction vehicle and positioned in a still uncorrected track section may be freely and rationally chosen, for instance at a high point of the track which requires no correction and to which the entire track is to be lifted.

(2) The movable point is located in the previously corrected track section and requires, therefore, no special watching.

A certain distance will be kept between the movable point and the track correction point to obtain accurate correction. If this movable point is mounted on a car coupled to the track correction vehicle, it will simply be pulled along with it.

Whether tensioning of the elongated, flexible member is effected at the movable point or at the track grade correction vehicle itself, it will be advantageous to anchor the end of the member to a continuously driven winding roll or the like. This roll may be driven by a hydraulic motor whose adjustable pressure relief valve is used for adjusting the rotational speed of the roll and the corresponding tension of the elongated member. Alternatively, a mechanical drive with a friction coupling may be used for this purpose.

The above and other objects, features and advantages of the present invention will be more fully explained in connection with two embodiments described in detail hereinafter, in conjunction with the accompanying drawing showing a schematic side view of a track grading apparatus according to one embodiment of the invention.

Referring now to the drawing, there is shown a track grade correction vehicle with a wheeled chassis 1 supporting a track lifting mechanism including a track gripping means. This is indicated only schematically since it is quite conventional and forms no part of the present invention. The illustrated track lifting mechanism includes a lift cylinder 2 wherein a piston 3 reciprocates upon the supply of a pressure fluid to the cylinder, the lower end of the piston rod having a footpiece 4 linked thereto. A track clamping device 5 is adapted to grip the track rails when the lift cylinder is operated. Track displacement means suitable for this purpose have been described, for instance, in our U.S. patent applications Serial No. 731,326, filed April 28, 1958, now Patent No. 3,041,982, and No. 819,979, filed May 26, 1959, abandoned in favor of No. 68,042, filed November 8, 1960, now Patent No. 3,103,182, but any other conventional means may be used for this purpose.

A vertically extending, calibrated measuring device 6 is fixedly mounted on chassis 1 to control the lifting stroke, lifting of the track being terminated when the desired calibration on the measuring device is in registry with the tensioned wire 7.

At a desired point of the uncorrected track section, a support, for instance a tripod, 8 is fixedly mounted on the track by clamps 9 to constitute the fixed point of anchorage for wire 7 which is guided over idler roller 11 to the wind-up roll 13. The idler roll 11 is mounted in brackets 17 on wheeled car 10 which provides a second support for the wire 7. The winding roll 13 is mounted in brackets 18 on chassis 1. The wind-up roll is continuously driven by a motor (not shown) to maintain the elongated, flexible member 7 under tension as the track grade correction vehicle approaches the fixed point 8. A rod 12 or like rigid coupling element connects the car 10 to vehicle 1 at a given distance so that car 10 and vehicle 1 are moved in unison along the track by a drive means (not shown) mounted on vehicle 1 and moving the vehicle in a direction opposite to that of the pull exerted upon the wire 7 by winding roll 13.

The track includes rails 14 and ties 15 resting on ballast 16.

The operation of the track correction system hereinabove described will be obvious from a mere examination of the drawing. One end of reference wire 7 will be fixedly anchored to a high point of the track, which constitutes the desired track grade. For this purpose, the tripod 8 is clamped in position on the track and the wire is tensioned by operating wind-up roll 13 on the track correction vehicle, the wire being accurately parallel to the desired grade of the track between the fixed front point and the movable back point constituted by idler roller 11 located in a previously graded section of the track.

The track lifting mechanism is operated to lift the track until the measuring device 6 contacts the reference wire (or a predetermined calibration is in registry therewith). In this corrected position, the track lifting mechanism holds the track in place and the track is then permanently supported at its corrected grade. The above operation is repeated and the track grade correction vehicle is repositioned step by step until it has reached fixed tripod 8 which is then moved to the next high point, fixed in position and the entire operation is repeated.

While the invention has been described in connection with certain specific embodiments, it will be understood that many variations and modifications may occur to the person having ordinary skill in the art, particularly after benefiting from the present teaching, without departing from the spirit and scope of this invention as defined in the appended claim.

We claim:

In an apparatus for correcting the grade of an ungraded track section, in combination:

(1) a first support;

(2) means for fixedly fastening said first support on a track point adjacent said track section;
(3) a movable second support on a previously graded track section and spaced from said first support;
(4) a mobile track grade correction means intermediate said supports on the ungraded track section;
(5) rigid means connecting the track grade correction means to the second support whereby the track grade correction means and the second support may move in unison towards said first support when the latter is fastened to said track point;
(6) an elongated flexible tension member connected to and extending between said supports, said tension member defining a reference line for determining the grade of the ungraded track section; and
(7) a driven wind-up roll to which one end of the tension member is anchored and the driven wind-up roll tensioning the tension member when the track grade correction means and the second support move in unison towards said first support.

References Cited in the file of this patent

UNITED STATES PATENTS

| | | |
|---|---|---|
| 1,057,001 | Lee | Mar. 25, 1913 |
| 2,734,463 | Hursh | Feb. 14, 1956 |
| 2,962,979 | McCormick | Dec. 6, 1960 |
| 2,974,607 | Talboys | Mar. 14, 1961 |
| 3,050,015 | Talboys | Aug. 21, 1962 |
| 3,071,082 | Talboys | Jan. 1, 1963 |

FOREIGN PATENTS

| | | |
|---|---|---|
| 218,106 | Australia | May 2, 1957 |
| 753,519 | Great Britain | July 25, 1959 |

OTHER REFERENCES

Nordberg Progress Magazine, 4th Quarter 1956, pp. 10 and 11.